United States Patent [19]

Banos et al.

[11] 4,183,232
[45] Jan. 15, 1980

[54] METHOD AND MACHINE FOR THREE-DIMENSIONAL WEAVING FOR OBTAINING WOVEN HOLLOW REINFORCEMENTS OF REVOLUTION

[75] Inventors: Jean Banos, Merignac; Jean-Claude Cantagrel, Saint Aubin de Medoc; Georges Cahuzac; Jean-Louis Darrieux, both of Merignac, all of France

[73] Assignee: Societe Nationale Industrielle Aero-Spatiale, Paris, France

[21] Appl. No.: 916,554

[22] Filed: Jun. 19, 1978

[30] Foreign Application Priority Data

Jun. 20, 1977 [FR] France .................................. 77 18831

[51] Int. Cl.² ...................... D04B 9/12; D03D 37/00; D03D 35/00
[52] U.S. Cl. .......................................... 66/11; 139/22; 139/14
[58] Field of Search ...................... 66/9 R, 10, 11, 13, 66/125; 139/11, 22, 14

[56] References Cited
U.S. PATENT DOCUMENTS

| | | | |
|---|---|---|---|
| 3,834,424 | 9/1974 | Fukuta et al. | 139/22 |
| 3,961,498 | 6/1976 | Braunschweiler | 66/13 |

Primary Examiner—Ronald Feldbaum

[57] ABSTRACT

The invention relates to woven hollow structures.

Its object is to provide a method and a machine making it possible to obtain hollow reinforcements of revolution by three-dimensional weaving using rods 11, circumferential yarns 12 and radial yarns 13. In the network of rods 11 made to rotate around the axis 16 are introduced and woven the yarns 12 and 13, the latter being knitted by a needle 28 in the form of a chain stitch, and the helical layers of yarns thus formed, resting on a plate 20 to which is imparted a progressive downward movement, slide along the rods 11 and are tamped by fingers 30 over which is mounted a pressure plate 38.

Application to the fabrication of woven reinforcements of complex shape for hollow bodies of revolution in plastic material.

15 Claims, 11 Drawing Figures

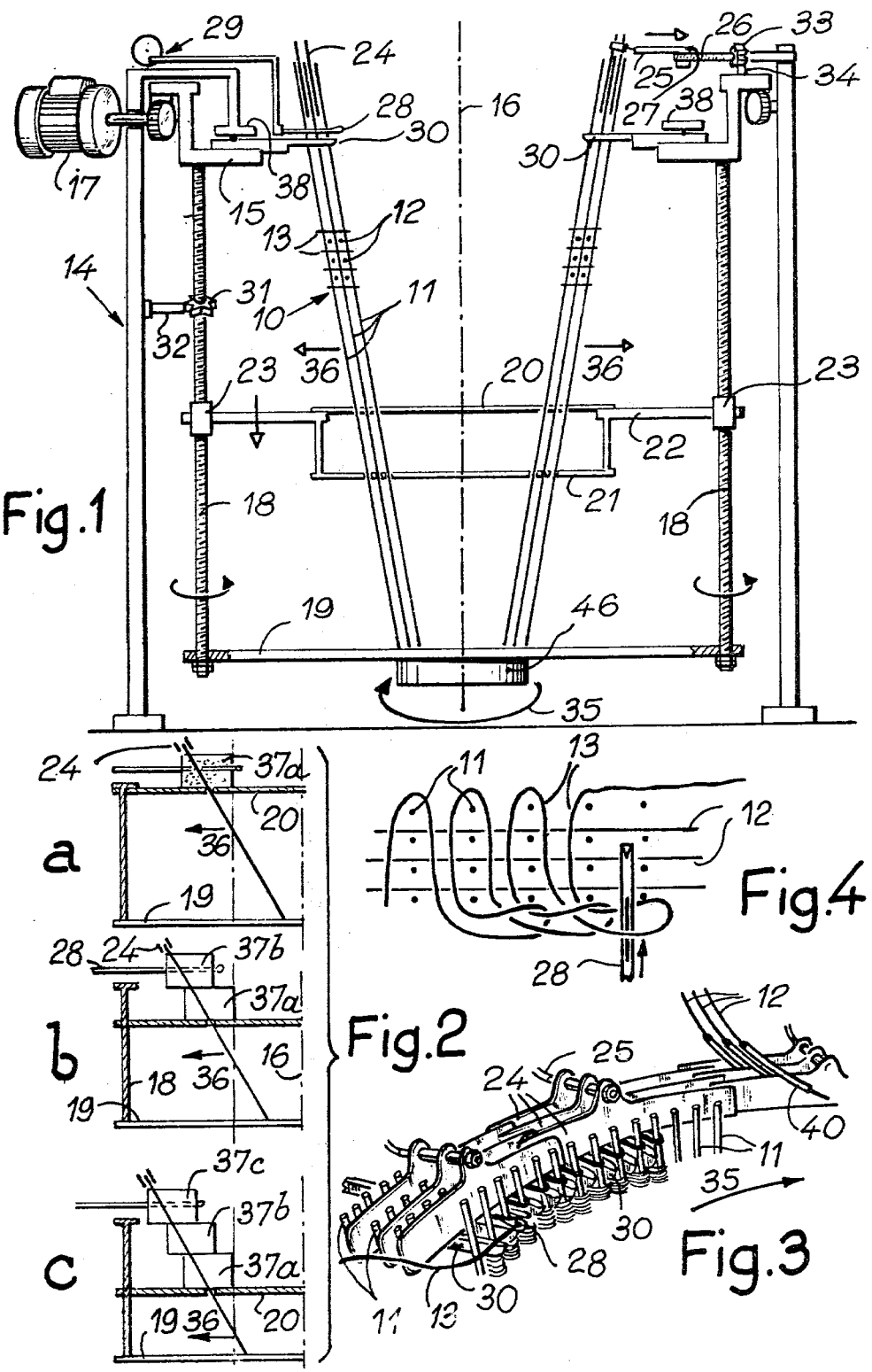

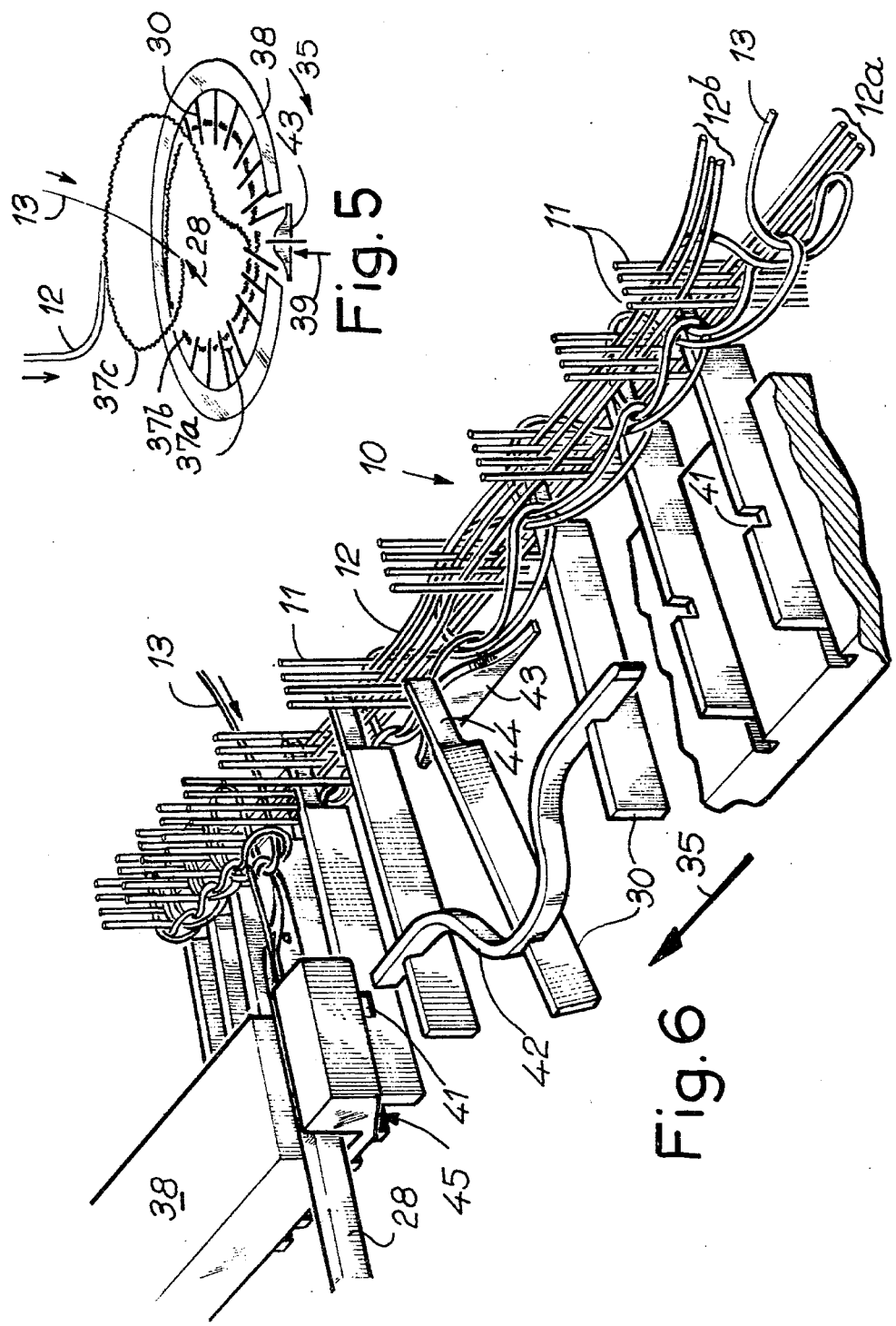

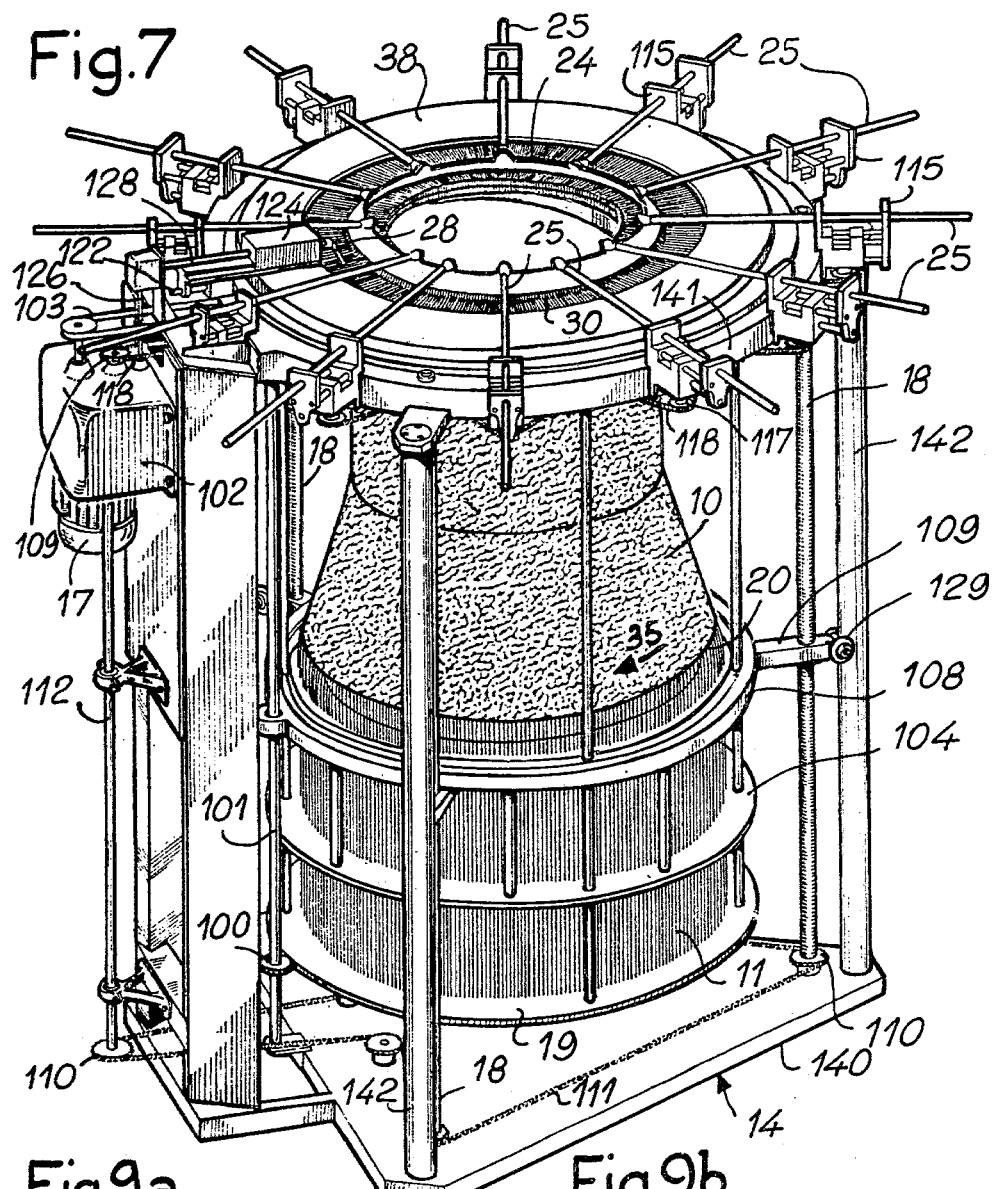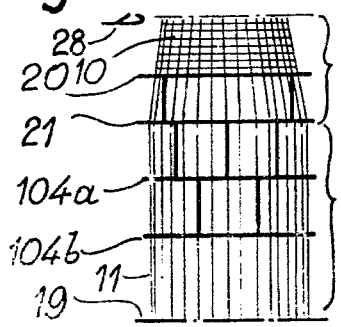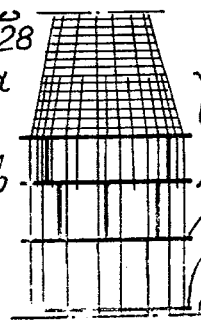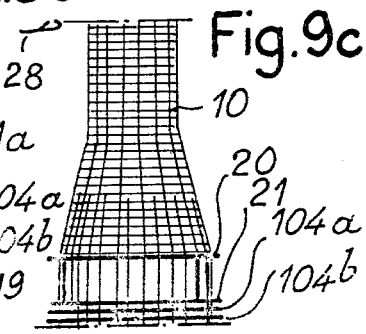

METHOD AND MACHINE FOR THREE-DIMENSIONAL WEAVING FOR OBTAINING WOVEN HOLLOW REINFORCEMENTS OF REVOLUTION

BACKGROUND OF THE INVENTION

This invention relates to the manufacture of parts of revolution by three-dimensional weaving capable of having a complex geometrical shape.

Woven parts of this type are used as reinforcement in the manufacture of hollow bodies of revolution obtained by the impregnation of such a part by means of a hardenable resin binder followed by machining to the precise dimensions desired for the hollow body. Such hollow bodies are used notably in the field of ballistic missiles and rockets.

A known method (U.S. Pat. No. 3,904,464) for making a hollow body of revolution, consists in fabricating, on a tool having the internal form of the part to be made, an "urchin" of radial pins in fibres and polymerized resin. These pins delimit longitudinal and circumferential "corridors" which are then, by simple winding, filled with resin-preimpregnated yarns. The assembly obtained is finally subjected to polymerization and then to machining and, if necessary, to reimpregnation under pressure followed by further machining.

This known method has the drawback of being long and complicated to implement, especially as regards the fabrication of the urchin which calls for many moulding, machining and glueing operations. Furthermore, the said method practically allows only the fabrication of parts having a simple geometrical form.

Another three-dimensional weaving method is described in the U.S. Pat. No. 3,834,424. That method requires a very complicated loom and does not lead to woven parts of revolution.

The French Pat. No. 73/14 956 describes, for its part, an apparatus for the fabrication by three-dimensional weaving of hollow parts of revolution of which the principle lies in the simultaneous helical laying, by means of a stitching head, of circumferential and radial yarns through a network of longitudinal rods made of polymerized resin fibre. This apparatus, although complicated, does not permit the fabrication of parts of complex form, but only cylindrical or, with great difficulties, conical parts.

Prior-art methods have, in addition to the indicated drawbacks, a drawback having to do with the quality of the parts obtained by three-dimensional weaving. This quality in fact depends directly on the fibre content of the woven parts and hence on the tamping during weaving. In prior-art methods, this tamping is obtained either manually or by the binding force induced by the tension of the circumferential yarns used. Tamping by binding force varies with the winding diameter, resulting in variations in the thickness of the part. In addition, in the case of large thicknesses, the binding force decreases from the inside toward the outside of the part, thus leading to a woven material which is heterogeneous in its thickness. The binding force also has a tendency to change the diameter of the courses laid, and this results in the slipping and shifting of fibres, harmful to final product quality.

SUMMARY OF THE INVENTION

It is an object of the invention to remedy these drawbacks and to define a method for making woven hollow reinforcements of revolution capable of offering a complex cylindro-conical form and having a high degree of packing without affecting the precision of the geometrical form and the quality of the products obtained.

This method consists in making a three-dimensional weave with a triple set of rods and yarns comprising, on the one hand, a network of rods placing parallel to the generatrices of the reinforcement of revolution to be made and ordered regularly around the axis of the latter in coaxial layers or rings of revolution and in successive circumferentially-spaced radial bunches and, on the other hand, circumferential yarns and, finally, radial yarns, these yarns being laid in helical courses and woven into said network of rods made to rotate around said axis.

According to the invention, these yarns are woven with rods at a fixed point in front of which the rods move while turning around the axis and at the level of which the rods are kept constantly in the suitable position and inclination with respect to the axis, determined by the geometrical shape desired for the reinforcement at the corresponding level, while the helical courses of yarns composing the already woven part of the reinforcement are made to move downward gradually along the rods and these courses are tamped by constantly pressing the upper courses—just woven—during the weaving in the direction of the lower course—first woven—supported at a gradually descending level.

The circumferential and radial yarns are laid and tamped in their final geometrical configuration and one obtains hollow structures offering a particularly dense, compact, rigid and geometrically precise wall. Weaving takes place at a fixed level at which are kept the rods and yarns in their final arrangement, which corresponds to the directions of a trirectangular trihedral. The circumferential yarns are laid in circumferential corridors which delimit the coaxial layers or rings of rods, and the radial yarns in radial corridors which delimit the successive bunches of rods, the latter extending in the longitudinal direction perpendicular to those of the circumferential and radial yarns.

Advantageously, the circumferential yarns are simply unwound and laid without tension between the coaxial layers or rings of rods, where they fall—owing to the rotation of the rod network—in helical turns forming successive flat courses without a binding force, while the radial yarns ae formed by a chain-stitched yarn at the fixed point of the weaving, this chain stitch enclosing by its loops the successive benches of rods, forming by the parts of its loops located between said bunches of rods the radial yarns and falling in helical courses between the successive courses of circumferential yarns.

Such a method makes it possible to fabricate reinforcements of complex form, not only cylindrical but conical or cylindro-conical ones. To prevent that, during the weaving of a zone having a diminishing shape (such as a conical zone flaring toward the bottom), the density of the network of rods should become excessive, it is necessary to reduce the number of rods in the narrowest region of the reinforcement, which can be achieved by removing the lower free part not yet covered with woven yarns of a certain number of rods regularly distributed around the periphery, the upper parts of these rods remaining in the already woven part of the reinforcement and descending with it during the continuation of the weaving.

It is also an object of the invention to provide a machine allowing the implementation of the above-defined method. This machine comprises essentially:

(a) a fixed frame in which is placed a set of rotating elements centred on a general vertical axis (coinciding with the axis of the reinforcement to be fabricated) rotatable around this axis, the rods being held in a regular network of circumferentially-spaced radial bunches and coaxial layers or rings, longitudinally supporting these rods and rotating said network around said axis, and tamping the courses of woven yarns in the network of rods;

(b) a radial needle type knitting device placed on said frame at a fixed location at the level at which the weaving takes place, this device however being capable of receiving a progressive radial movement moving it toward or away from the axis during the weaving of a portion of conical reinforcement;

(c) a set of expansible (or retractable) crowns located immediately over the level at which the weaving takes place, the diameter of which is capable of being progressively increased or decreased during the weaving of a conical portion and which are placed between the coaxial layers or rings of rods so that these crowns impose on the rods their position and their inclination with respect to the axis in the region in which weaving is taking place, which corresponds to the upper part of the rods.

Said set of rotating elements comprises preferably:

(a) a stop plate placed at a fixed level at the lower part of the machine, on which rest the lower ends of the rods;

(b) an annular part placed at the top of the machine immediately under the fixed level at which weaving is to take place and carrying in radial notches a succession of radial fingers which advance between the bunches of rods and on which is laid the chain stitch forming the radial yarns, these fingers delimiting radial corridors between the bunches of rods;

(c) a double plate equipped on its upper face and on its lower face with perforations arranged regularly according to circles centred on the axis and traversed by the rods, this double plate being imparted, in addition to its rotating movement, a controlled and progressive downward movement during the weaving of the reinforcement, and supporting the latter while allowing its descent along the rods.

The stop plate prevents any downward longitudinal slipping of the rods.

The radial fingers maintain the regular spacing of the rods at their upper part at the level at which weaving takes place. They moreover ensure downward slipping and the tamping of the courses of yarns of the already woven part resting on the double perforated plate. For this purpose, the radial fingers are capable of moving in notches formed in the annular part which carries them and, when they encounter a set of fixed cams placed in a predetermined region of the circular path which they follow while rotating, they are lifted and retracted slightly under the action of these cams so that they are freed from under the course of circumferential and radial yarns already woven on them, and are then moved forwardly so that they are applied over this course so as to allow the slipping and tamping of all the courses of yarns in cooperation with the double plate which supports them.

In order for the radial fingers to constantly ensure perfect tamping of the woven part of the reinforcement, they must be surmounted by a fixed horizontal pressure plate which forces them to remain at a constant level so that they push the already woven turns of yarn downward and keep them under pressure in a positive manner as they are formed. One thus obtains regular packing of the woven material by ensuring that the double plate descends with respect to the fixed plane at which the fingers remain with each turn of a quantity equal to the thickness of a tamped course of circumferential and radial yarns. To allow the lifting of the fingers upon their passage over the cams, the pressure plate is given the form of a ring which is interrupted at this location.

Thus, the method according to the invention may be implemented by means of a unitized machine making it possible to produce woven hollow parts of a complex shape economically in series in an almost fully automatic manner, this machine offering the possibility of changing over without difficulty from one shape to another. Known methods offering equivalent flexibility are either fully manual and hence not suited to series production or are mechanized but then require the use of several means of execution and lead to high fabrication costs.

BRIEF DESCRIPTION OF THE DRAWINGS

The following description, with reference to the drawings appended by way of nonlimitative examples, will make it possible to better understand how the invention may be implemented.

FIG. 1 shows, in axial section, in a schematic and simplified manner, a machine according to the invention.

FIG. 2 illustrates schematically several stages in the weaving of a conical reinforcement.

FIG. 3 shows, in perspective, a fragmentary part of the expansible crowns on which weaving takes place.

FIG. 4 shows schematically, in a top view, the method of interlacing the yarns and rods constituting one portion of a course of woven reinforcement.

FIG. 5 shows schematically, in perspective, the movements of radial fingers tamping a reinforcement being woven.

FIG. 6 is a fragmentary perspective view showing how a woven reinforcement is formed and tamped.

FIG. 7 shows, in perspective, a preferred embodiment of the machine according to the invention.

FIGS. 9a, 9b and 9c illustrate stages in the method for making a cylindro-conical woven reinforcement.

DESCRIPTION OF THE PREFERRED EMBODIMENTS

Figure 8:
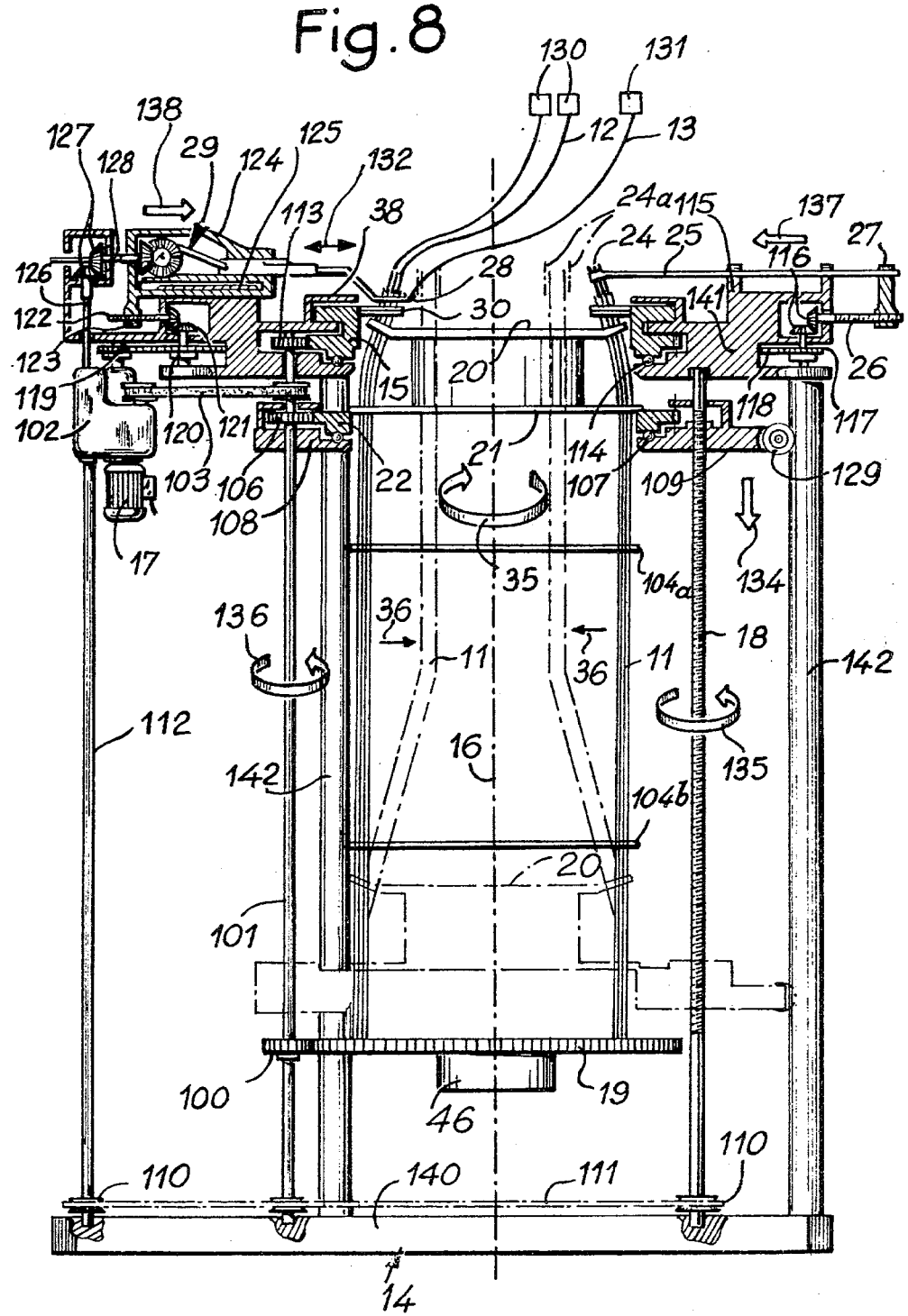
FIG. 8 is an elevational view, partly in cross-section, of the machine of FIG. 7 and shows the initial step and the final step in the weaving of a cylindro-conical reinforcement.

In FIGS. 1, 7 and 8 are seen the essential elements of a machine according to the invention making it possible to obtain a hollow reinforcement of revolution 10 with a thick wall woven in three dimensions. In the present example, this reinforcement has a conical form flaring upwardly; it is constituted by the interlacing of three layers of yarns or rods which extend along three trirectangular directions, namely bunches of rods 11 arranged along the generatrices of the cone, layers of circumferential yarns 12 arranged along the circles centred on the axis 16 of the reinforcement 10, and layers of radial yarns 13 arranged along the thickness of the reinforcement (see also FIG. 4). The circumferential yarns 12 and the succession of radial yarns 13 form superposed courses which wind helically while filling the conical wall of the reinforcement 10.

The machine comprises a fixed outer frame 14 of generally cylindrical form at the top of which is mounted an annular part 15 coaxial with the reinforcement 10 to be made and capable of rotating around the axis 16 of the latter under the action of a motor 17. Under this part is suspended, by rotary threaded rods 18 distributed equi-angularly around the axis 16, a plate 19 called a "stop plate" on which rest the bottoms of rods 11. The latter are kept in a suitable position by a double plate the integral faces 20 and 21 of which are pierced with perforations arranged according to as many circles centered about the axis 16 as there are rods 11 in each circumferentially spaced bunch (three in the example of FIG. 1). The radii of the circles of the perforations in the faces 20 and 21 are chosen in accordance with the diameter and with the conformation (cylindrical or, as in the present example, conical) of the bottom of the reinforcement, this bottom part being woven first. The double plate 20, 21 is carried by an annular support 22 equipped with threaded blocks 23 which traverse threaded rods 18.

Moreover, the rods 11 are maintained at their upper end by crowns 24 centred about the axis 16 and placed in the intervals separating the concentric rings of rods 11. Each crown 24 is made up (FIG. 3) of a succession of curved segments of thin sheetmetal set side by side so as to overlap and be held in groups by means of radial rods 25 distributed equi-angularly around the axis 16 and capable of being moved longitudinally by means of lead screws 26 going respectively through a nut 27 integral with each rod 25 as can be seen most clearly in FIG. 8. Thus, the crowns 24 can exhibit a variable diameter, i.e. they are expansible (or retractable). These crowns allow the introduction of circumferential yarns 12 between the coaxial layers or rings of rods 11.

The machine also includes, at the level of the part 15, a latch needle 28 oriented radially and to which may be imparted, by a crank-connecting rod mechanism 29, a radial reciprocating movement between the bunches of rods 11.

At the beginning of the weaving of the conical reinforcement, the rods 11 are arranged in the machine in radial bunches and coaxial layers or rings; they go through the perforations of the double plate 20, 21 which are at such time in the upper position, i.e. located immediately under the part 15. The rods 11 are moreover supported by the expansible crowns 24 and their lower extremities rest on the stop plate 19. The circumferential yarns 12 feed down from bobbins (not shown) and run along the crowns 24 to lay in concentric circles between the respective layers or rings of rods 11, resting on a series of fingers 30 arranged radially in notches of the annular part 15 within which they can slide. In their normal position, these fingers go through and guide all the coaxial layers or rings of rods 11. With the starting of the motor 17 the part 15, the fingers 30, the lead screws 18, the perforated double plate 20, 21 by virtue of its support 22 and the stop plate 19 are all caused to rotate about axis 16 so that the network of rods 11 is also rotated around the axis 16. However, the crowns 24 do not rotate, nor does the needle 28, the latter simply being given a radial reciprocatory movement by the mechanism 29 driven by the motor 17 through the rod layers or rings and between the bunches of rods 11, so as to catch a yarn delivered by a bobbin (not shown) and chain-knit it so as to form a chain stitch with such yarn enclosing a bunch of rods 11. During the rotation of the network of rods 11, the circumferential yarns 12 and the chain stitches of radial yarns 13 are arranged helically to form a three-dimensional interlacing with the rods 11.

On the lead screws 18 is fixedly secured a respective toothed wheel 31 which engages at intervals one or several fixed tongues 32 carried by the frame. Each time, the lead screws 18 are caused to turn by a certain predetermined angle, thereby causing the perforated double plate 20, 21 to descend by one step. The same applies to the lead screws 26: they have a toothed wheel 33 cooperable with one or several fixed tongues 34 so that the crowns 24 expand step by step. Thus, during the weaving, the rods 11, in addition to their rotating movement around the axis 16 in the direction of the arrow 35, are imparted a centrifugal translational movement in the direction of the arrows 36, their lower ends sliding on the stop plate 19. Correlatively, the successive helical courses formed by the yarns 12 and 13 slide downward along the rods 11 as shown schematically in FIGS. 2a, 2b and 2c. FIG. 2a corresponds to the beginning of the weaving process when a first layer 37a of yarns 12, 13 is woven, which rests on the upper face 20 of the perforated double plate. In FIG. 2b, a second course 37b is formed at the fixed level of the needle 28, while the course 37a is lowered with the perforated plate 20 and, in FIG. 2c, a third course 37c is formed over the courses 37a, 37b having slid to a lower level. Thus, the woven reinforcement, as it is being made, is lowered along the rods 11, the courses moving away from the axis 16 in accordance with the downward movement of the perforated plate 20 on which they rest and the expansion movement of the crowns 24. In the case of a downward flaring reinforcement, the translational movement of the rods 11 takes place in the opposite direction, i.e. toward the axis 16.

The woven reinforcement is urged downwardly by the set of fingers 30, arranged in a crown as shown schematically in FIG. 5 corresponding to FIG. 2c. The fingers 30, which revolve around the axis 16 with the woven reinforcement 10, rest on the second turn 37b and press it downward, the fingers being surmounted by an annular pressure plate 38 fixed to the frame 14 and centred about the axis 16. The plate 38, whose lower face against which slide the fingers 30 can be covered with a material having a low friction coefficient, is interrupted at 39 to allow the withdrawal and temporary lifting of the fingers 30 passing at this point, so that the latter can be retracted from under the end of the last turn 37c and can be applied over it. These fingers, maintain a fixed level due to the pressure plate 38, and progressively push downward the courses of the woven reinforcement each of which is formed over them. The lowering and tamping of the woven reinforcement thus obtained are enhanced by the action of a vibrator 46 (FIG. 1) associated with the stop plate 19, preferably on its lower face, and which imparts to the network of rods 11 a longitudinal vibratory movement. The vibrator 46 periodically causes a slight rising of the rods 11 within the woven reinforcement; they are then brought back to their initial position by the lowering of the woven part which carries them along.

FIG. 6 illustrates the relative arrangement of the yarns and rods of the reinforcement 10 and the operation of the needle 28 and of the fingers 30. During rotation in the direction of arrow 35 of the reinforcement 10 and of the successive bunches of rods 11 between which the radial fingers 30 penetrate, circumferential yarns 12 are unwound and are laid in flat courses in a continuous manner between the coaxial layers or rings of rods 11, passing between the expansible crowns 24 through guide tubes 40 (FIG. 3) which are secured with a slight inclination to certain segments of these crowns downstream of the needle 28 (the tubes 40 can be grouped at the same location of the crowns 24 or can be spaced along the crowns to avoid any risk of mixing the yarns 12). In FIG. 6 is seen a course of yarns 12a already incorporated in the reinforcement 10 and another course of yarns 12b which has just been laid through the tubes 40. Between these two courses, the needle 28 has formed a chain stitch from radial yarns 13 which it continues to form over the circumferential course 12b as seen in the left-hand part of FIG. 6. This chain stitch, the classical structure of which is visible in FIGS. 4 and 6, holds the successive bunches of rods 11 and rests on the fingers 30. The travel of the needle 28 is adjustable in order to obtain the optimum stitch tightness which makes it possible to follow the geometry of the woven structure and to comply with the desired thickness.

In the right-hand part of FIG. 6, the fingers 30 are applied on the circumferential layer 12a while the chain stitch 13 and the course 12b are located over them. In the region 39 where the pressure plate is interrupted are placed two stationary cams 42 and 43; the fingers 30 which have been rotated to this region engage through a notch 41 with the withdrawal cam 42 having a curved form which makes them retract and withdraw from the reinforcement during weaving, while the lifting cam 43, forming a hump, controls the lifting of their ends 44 over the level of the course 12b. The result is that at the exit from the region 39, when the fingers 30 leave the symmetrical cams 42 and 43 and assume their normal positions, they are reintroduced between the bunches of rods 11. However, the fingers now surmount the layer 12b and the chain stitch 13. Then, engaging under the pressure plate 38 which has an entry chamfer 45, the fingers press downward the course 12b and the chain stitch 13 and ensure the lowering of all the other underlying courses constituting the already woven part of the reinforcement 10, as well as the tamping of these courses along the rods 11. Thus, the completed part of the reinforcement 10, supported by the double plate 20, 21, is continually pressed downward and tamped by the combined action of the fingers 30 and the horizontal pressure plate 38 which gives them a fixed and well-determined level throughout the weaving operation.

Contrary to what might be inferred from FIG. 6, the successive bunches of rods 11 and the fingers 30 reciprocated between them are uniformly spaced and are very close to each other angularly, the spacing between the fingers 30 capable of being of the same order of magnitude as their thickness. The number of fingers 30 is equal to the number of bunches of rods 11. The number of rods 11 in each bunch, shown in the figures by way of example as being three or four, may be of any value; it is sufficient to provide in each case an equal number of perforation rings in the double plate 20, 21 and at least an equal number of expansible crowns 24. The number of circumferential yarns 12 is smaller by one unit than the number of rods 11 in each bunch, i.e. than the number of coaxial layers or rings of rods in the bunches.

As the weaving of the conical reinforcement 10 progresses, its diameter at the level of the needle 28 varies, as explained with respect to FIGS. 2a, 2b and 2c. This variation is accompanied, in the illustrated cae of a reinforcement having the form of an upward flaring cone, by an expansion of the crowns 24 under the action of the screw-nut systems 26, 27 associated with the elements of said crowns (FIG. 1), as well as by a progressive moving away of the reciprocating path of the needles 28 from the middle position with respect to the general axis 16, by means of a mechanism which is not shown. All these movements, as well as the lowering of the double plate 20, 21, take place in synchronism driven by the motor 17.

It is to be observed that the double plate 20, 21 is initially in the upper region of the machine and establishes the conformation of the upper part of the rods 11 where the lower part of the reinforcement is to be woven first. The structure of this perforated double plate thus corresponds to the form of the base of the reinforcement to be made.

FIGS. 7 and 8 represent a preferred embodiment of a machine according to the invention. The weaving of a complex structure, i.e. a cylindro-conical reinforcement will now be explained with reference to these figures.

This machine has a general structure similar to that of the simplified machine of FIG. 1, and the corresponding elements have been given the same references. It comprises firstly a frame 14, made up of two end plates 140, 141, respectively triangular and circular, connected by three columns 142 parallel to the longitudinal axis 16 of the machine. This frame contains an externally-notched stop plate 19 having a constant level and rotated by a pinion 100 keyed on a splined shaft 101 which is rotated by a motor 17 equipped with a reducer 102 via a notched belt 103. The stop plate 19, which is equipped with a vibrator 46, receives a set of rods 11 going through the perforations of a perforated double plate 20, 21 serving for initial holding and through intermediate plates 104a, 104b which are placed between the double plate 20, 21 and the stop plate 19 and serve to hold the rods in a direction parallel to the axis 16. The double plate 20, 21 is carried by an externally-notched annular support 22 rotatable around the axis 16 by a pinion 106 mounted on the splined shaft 101 and is capable of sliding along the shaft, the support 22 being carried, via a ball-type annular bearing 107, by another support 108 also of the annular type but which is not rotatable. The latter has three arms 109 pierced with threaded holes through which go three lead screws 18 rotatable between the end plates 140 and 141 by the motor 17 via pinions 110, a chain 111, a shaft 112 and the reducer 102. The arms 109 are equipped with pulleys 129 used for guiding support 108 along the columns 142.

To the upper end of the shaft 101 is keyed a third pulley 113 which meshes with the toothed periphery of an annular part 15 which carries in radial notches thereof the fingers 30 and which thus rotates around the axis 16 on the end plate 141 via a ball-type annular bearing 114. A pressure plate 38 surmounting the fingers 30 is integral with the end plate 141. The end plate also carries a series of supports 115 in which can slide the radial rods 25 having, at their inner ends facing the axis 16, expansible crowns 24 divided into circularly juxtaposed elements. At the other end of each of the rods 25 is fixed a nut 27 meshing with a lead screw 26 that is rotatable by the motor 17 via pinions 116, a toothed wheel 117, a chain 118 and a toothed wheel 119 driven by the reducer 102. The chain 118 follows a star path, engaging with all the toothed wheels 117 and the return toothed wheels not visible in the figures. It also engages with a toothed wheel 120 which allows the rotation, via pinions 121, of a lead screw 122 also placed radially and meshing with a nut 123 integral with the casing 124 of the mechanism 29 of the needle 28, which slides on the end plate 141 in a radial slideway 125. This arrangement makes it possible to modify the average radial position of the needle 28 with respect to the axis 16 during the weaving of a portion of conical reinforcement, just as the radial rods 25 slide longitudinally to modify the diameter of the expansible crowns 24.

The casing 124 contains a crank-connecting rod mechanism 29 which is capable of imparting a reciprocatory movement to the needle 28 around its average position under the action of the motor 17 and via the reducer 102, a shaft 126 and pinions 127, the output pinion being mounted on a splined shaft 128 driving the mechanism 29 while allowing its radial movements.

To obtain a woven reinforcement of revolution, one places inside the machine the rods 11 kept parallel to the axis 16 by the perforated plates 104a and 104b, and resting on the stop plate 19. When a conical reinforcement is to be made, the rods are positioned so as to extend through the double plate 20, 21 which is used for initial holding and in which the respective sets of perforations have a different average radius corresponding to the degree of conicity of the reinforcement to be produced. The double plate, which rests on the annular support 22 initially in the upper position, deforms the top of the rods (flexible) to give them a form correspnding to the bottom of the desired conical reinforcement article. Moreover, between the upper ends of the rods 11 are placed the expansible crowns 24 after having set their diameter at the right value by an initial adjustment of the position of the radial rods 25. The average position of the needle 28 is also set by adjusting the initial position of the casing of mechanism 124. One then introduces between the layers of rods 11 the circumferential yarns 12 fed out by bobbins 130 and resting initially on the radial fingers 30, as well as the yarn 13 fed by a bobbin 131 used for forming a chain stitch of radial yarns under the action of the needle 28.

The motor 17 is then started up, thereby imparting a reciprocatory movement in the direction of the double arrow 132 to the needle 28 and imparting a rotation, in the direction of arrow 136, to the shaft 101 which causes rotation around the axis 16 in the direction of the arrow 35 of the annular support 22 and the double plate 20, 21, the stop plate 19, the annular part 15 and the radial fingers 30, as well as all the rods 11. The weaving of the reinforcement begins at the section which will form the bottom of the completed reinforcement article. Each spiral of knitted yarn is tamped against the upper plate 20 by the fingers 30 as already explained (FIGS. 5 and 6). At the same time, the annular supports 108 and 22 move down progressively (in the direction of arrow 134) under the action of the screws 18 turning in the direction of the arrow 135 so that the woven part descends while sliding along the rods 11. The upper portions of the rods move progressively closer to the axis 16 while their slipe is maintained, being guided by the crowns 24 which decrease in diameter progressively in the direction of the arrow 137 (because, in the present example, the armature has a conical part which decreases upwardly). The casing 124 and the needle 28 also move closer to the axis 16 at the same rate and in synchronism, in the direction of the arrow 138. If an intermediate plate 104 hinders the downward progression of the double plate 20, 21, this plate is freed from its support and moves out of the way by falling. Thus, as shown in FIGS. 9a to 9c, the two intermediate plates 104a, 104b lie upon each other supported by the stop plate 19 when the weaving is completed.

If it is desired to make a reinforcement of complex form, for example a cylindro-conical reinforcement consisting of a truncated cone flaring downwardly and surmounted by a cylinder, one need only, when the weaving of the truncated portion is completed (FIG. 9b), change the expansible crowns 24 (see FIG. 3) having a conical shape and install fixed crowns 24a (carried by non-moving arms 25) having a cylindrical shape. These new crowns move the upper end of the rods 11 parallel to the axis 16 so that weaving takes place cylindrically. The casing 124 of the needle 28 is thus immobilized. To accentuate the distinctness of the transition between the truncated and cylindrical portions, a strap may be placed around the end of the truncated portion (already woven) just under the level of the fingers 30.

When, during the weaving of a conical portion, the diameter of the reinforcement article becomes too small considering the number of bunches of rods 11 initially planned and suitable more appropriately for the widest part of the reinforcement, the number of rods 11 should be reduced for the narrowest region of the reinforcement. For this purpose, roughly at the moment of the weaving of the middle part of the truncated cone (FIG. 9a), one cuts under the plate 21 the rods 11 of a certain number of radial bunches (for example the rods of one bunch out of every two or three) and the lower portions 11b of the rods thus cut are removed. Moreover, the annular part 15 and its set of radial fingers 30 ane replaced by another part 15 which still has regularly distributed fingers but in a smaller number and with a spacing corresponding to the smaller number of rods. The new crown of fingers 30 causes the uncut bunches of rods to succeed each other again in an equidistant manner. Hence, with the weaving continuing (FIG. 9b), the upper portions 11a of the cut rods remain in the woven part of the reinforcement 10 during fabrication and descend with it, unlike the uncut rods 11 which remain supported on the stop plate 19. At the end of the operation (FIG. 9c), one thus obtains a reinforcement 10 whose wide part has more rods 11 than the narrow part.

In the machine of FIG. 8, the rods 11 describe, as in the machine of FIG. 1, a radial movement in the direction of the arrows 36 when the reinforcement article has a conical portion (as seen by comparing the initial and final configurations of the rods, respectively drawn in continuous and broken lines in FIG. 8). However, there is no longer an overall movement, the rods 11 now being maintained in the lower part by the intermediate plates 104 so that their lower end no longer slides on the stop plate 19. Another difference consists in the fact that the driving of the different elements takes place in a continuous manner in the machine of FIG. 8 and step-by-step in the machine of FIG. 1. However, in both cases, all the moving elements are driven in synchronism by the motor 17. The vibrator 46 operates in an independent manner.

The embodiment of a particular cylindro-conical reinforcement in accordance with the preceding description can be applied to the production of reinforcements having any complex cylindro-conical form. The transitions between cone and cylinder or cones with different apex angles are done in a similar manner by changing the expansible crowns and by modifying the relationship between the progressive movement of these crowns and of the needle. It is even possible to consider the fabrication of reinforcements having curved generatrices by using nonlinear displacement relationships. This variety of forms is made possible essentially because of the control of the configuration of the rods which is constantly ensured by the expansible crowns at the weaving level.

The yarns used can consist of a single strand or of multiple strands. In the latter case, it is preferable to guide each strand individually to lay it in the network of rods.

The longitudinal rods can be either, for example, rods in prepolymerized resin-fibre in which case they constitute, as was seen, the longitudinal filling of the material when the structure is woven, or metallic rods which, after weaving, are replaced, using any suitable system, by yarns which serve as longitudinal filling.

What is claimed is:

1. A method of producing a three-dimensional hollow woven reinforcement article comprising the steps of rotating a plurality of rod-bunches circumferentially arranged about a central axis, each rod bunch having a plurality of elongated rods spaced along a common radius and respectively lying in circumferentially spaced relation to the corresponding rod in the adjacent rod bunch, feeding a substantially continuous yarn between each of the adjacent radially-spaced rods to form superimposed courses of helically wound yarn; simultaneously feeding a further yarn radially between adjacent circumferentially spaced rod bunches intermediate each of said courses and forming chain stitches in said further yarn enclosing the radially-spaced rods of each rod bunch between each of said courses of helically wound yarn; and pressing said helically wound yarn and chain-stitched yarn along said rods to obtain a generally woven article of uniform density.

2. The method according to claim 1 including the steps of inclining said rod bunches relative to the central axis.

3. The method according to claim 1, wherein said substantially continuous yarn is fed between said radially-spaced rods in an untensioned state to form flat helical courses thereof.

4. The method according to claim 2, including the step of supporting the lower extremities of said rods throughout the weaving, and supporting the woven yarn for downwardly movement along said rods progressively during rotation of said rods and said weaving.

5. A method according to claims 1, 2, 3, or 4, including the step of reducing the number of rod bunches in a selected circumferential region by removing the lower extremities of a selected number of rod bunches, and maintaining the remaining rod bunches in equ-distantly spaced relation with each other.

6. A method according to claim 1, wherein said chain-stitch is formed by a needle arranged to move perpendicularly with respect to the control axis.

7. Apparatus for producing three-dimensional hollow woven reinforcement articles comprising:
a frame;
a plurality of rod bunches, each bunch comprising a plurality of radially-spaced rods carried by said frame, said bunches being arranged in circumferentially-spaced relation and rotatable about a central axis;
means rotatably carried by said frame for supporting said rods;
a needle carried by said frame for horizontal reciprocatory movement and in predetermined relation to the rotative path of said rods;
means for feeding a substantially continuous first yarn between corresponding one of adjacent radially-spaced rods;
means for simultaneously feeding a substantially continuous second yarn radially between each of said bunches;
and means for rotating said rods about said central axis and for reciprocating said needle in synchronism with the rotation of said rods, to simultaneously form a helix of superimposed courses of said first yarn between said radially spaced rods, having interposed between said courses a chain stitch of said second yarn binding said rods.

8. The apparatus according to claim 7, including a series of concentric radially adjustable rings of crown members carried by same frame at a level above said needle, respective ones of said crown members being positionable between adjacent corresponding radially-spaced rods of all of said rod bunches serving to establish the inclination of said rods relative to said central axis.

9. Apparatus according to claim 8, wherein said means for supporting said rods comprises a stop plate which is rotatable at a fixed elevational level; an annular member concentric with said axis is carried rotatably by said frame at a level below said needle, said annular member having a plurality of radial slots formed therein in circumferentially-spaced relation; a radially reciprocable finger member is positioned slidably in each of said radial slots; cam means fixedly carried by said frame cooperable with said finger members for advancing successive ones of said finger members between successive bunches of rods over a course of circumferential yarn and for retracting said finger members after a chain stitch has been formed and the next course of circumferential yarn laid thereover, said cam means also serving to raise the retracted finger members above the level of said next course of circumferential yarn for subsequent advancement thereover; means for supporting said woven yarn comprising first and second superposed plate members rotatably carried by said frame and capable of progressive downwardly movement, a plurality of concentric rings of apertures being formed in said plates arranged to receive said rods therethrough.

10. Apparatus according to claim 9, including a stationary annular pressure plate carried by said frame above said finger members and cooperable therewith to urge said finger members downwardly for rotation about said axis at a substantially constant elevational level except at the location of said cams, said pressure plate being interrupted at such location to permit raising of successive finger members by said cam means.

11. Apparatus according to claim 8, wherein the crown member of each concentric ring includes a plurality of arcuate segments each of which overlaps radially at the ends thereof with the next adjacent segment.

12. Apparatus according to claim 11, including means for moving said rings of crown members radially in synchronism with the rotation of said rods.

13. Apparatus according to claim 8, wherein said needle is a latch-type needle.

14. Apparatus according to claim 9, including at least one apertured intermediate plate carried between said stop plate and said first and second plates, the apertures in said intermediate plate being arranged to receive said rods and said plate serving to maintain said rods in a direction substantially parallel to said axis, said at least one intermediate plate being releasably carried by said frame so as not to interfere with the downwardly movement of said first and second plates.

15. Apparatus according to claim 9, including means associated with said stop plate for imparting longitudinal vibrational movement to said rods.

* * * * *